US008213688B2

(12) United States Patent
Hauck et al.

(10) Patent No.: US 8,213,688 B2
(45) Date of Patent: Jul. 3, 2012

(54) METHOD AND APPARATUS FOR OPERATING PRINTING PRESSES

(75) Inventors: Dieter Hauck, Eberbach (DE); Till Maier, Heidelberg (DE); Mario Rottloff, Neckargemünd (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 961 days.

(21) Appl. No.: 11/805,878

(22) Filed: May 24, 2007

(65) Prior Publication Data

US 2007/0272106 A1 Nov. 29, 2007

(30) Foreign Application Priority Data

May 24, 2006 (DE) ........................ 10 2006 024 380

(51) Int. Cl.
*G06K 9/00* (2006.01)

(52) U.S. Cl. ........................................................ 382/112

(58) Field of Classification Search .................. 382/112, 382/175; 358/3.23

See application file for complete search history.

(56) References Cited

U.S. PATENT DOCUMENTS

| | | | | |
|---|---|---|---|---|
| 3,722,393 | A * | 3/1973 | Drevitch | 396/428 |
| 4,955,290 | A * | 9/1990 | Kipphan et al. | 101/183 |
| 5,163,012 | A | 11/1992 | Wuhrl et al. | |
| 5,511,148 | A * | 4/1996 | Wellner | 358/1.6 |
| 5,625,703 | A * | 4/1997 | Okuda et al. | 382/112 |
| 5,712,921 | A * | 1/1998 | Zabele | 382/112 |
| 6,112,658 | A * | 9/2000 | Gunther et al. | 101/171 |
| 6,153,841 | A * | 11/2000 | Hart | 200/314 |
| 6,167,806 | B1 | 1/2001 | Chretinat et al. | |
| 6,373,964 | B1 * | 4/2002 | Geissler et al. | 382/112 |
| 6,382,101 | B1 * | 5/2002 | Richards | 101/365 |
| 6,449,385 | B1 * | 9/2002 | Huber et al. | 382/112 |
| 6,976,425 | B2 * | 12/2005 | Morikawa et al. | 101/364 |
| 7,054,017 | B2 * | 5/2006 | Terrill et al. | 358/1.14 |
| 7,440,123 | B2 * | 10/2008 | Chodagiri et al. | 358/1.13 |
| 7,652,792 | B2 * | 1/2010 | Honeck et al. | 358/1.9 |
| 2003/0007154 | A1 * | 1/2003 | Tandon et al. | 356/406 |
| 2003/0063275 | A1 * | 4/2003 | Hubble et al. | 356/319 |
| 2003/0222230 | A1 * | 12/2003 | Brauner et al. | 250/559.29 |
| 2004/0042022 | A1 * | 3/2004 | Friedman et al. | 358/1.9 |
| 2006/0050320 | A1 * | 3/2006 | Ozaki et al. | 358/3.29 |
| 2008/0212844 | A1 * | 9/2008 | Turke et al. | 382/112 |

FOREIGN PATENT DOCUMENTS

| | | | |
|---|---|---|---|
| DE | 32 20 803 | A1 | 12/1983 |
| DE | 39 24 989 | A1 | 2/1991 |
| DE | 198 07 866 | A1 | 9/1998 |
| DE | 198 56 675 | A1 | 9/1999 |
| EP | 0 622 722 | A2 | 4/1994 |
| EP | 1 433 606 | A1 | 6/2004 |
| WO | WO 02/08730 | A1 | 1/2002 |

* cited by examiner

*Primary Examiner* — Sath V Perungavoor
*Assistant Examiner* — Shervin Nakhjavan
(74) *Attorney, Agent, or Firm* — Laurence A. Greenberg; Werner H. Stemer; Ralph E. Locher

(57) ABSTRACT

A method for controlling operating processes or measuring processes in connection with a printed image applied to a printing material, includes acquiring image information from the printed image on the printing material with a camera device. The data acquired by the camera is compared in a computer with digital image data of the printed image. Operating processes or measuring processes are triggered by the computer on the basis of the identified printed image on the printing material. The printing material is displayed on a desk, the camera device detects objects or persons covering the printing material and specific operating, processes or measuring processes are triggered on the basis thereof. An apparatus for carrying out the method is also provided.

15 Claims, 2 Drawing Sheets

METHOD AND APPARATUS FOR OPERATING PRINTING PRESSES

CROSS-REFERENCE TO RELATED APPLICATION

This application claims the priority, under 35 U.S.C. §119, of German Patent Application DE 10 2006 024 380.3, filed May 24, 2006; the prior application is herewith incorporated by reference in its entirety.

BACKGROUND OF THE INVENTION

Field of the Invention

The present invention relates to a method for controlling operating processes or measuring processes in connection with a printed image applied to a printing material. A camera device acquires image information from the printed image on the printing material. The data acquired through the use of the camera is compared in a computer with the digital image of a printed image. Operating processes or measuring processes are triggered by the computer on the basis of the identified image printed on the printing material. The invention also relates to an apparatus for carrying out the method.

Modern printing presses offer a large number of possible settings, which makes the operation correspondingly complicated for personnel. Given the large number of possible operations, the risk of an error during the entry or selection of functions necessarily also rises. There is therefore an endeavor to make the operation of printing presses and other complex machines in the graphics industry easier. Such a method is disclosed by European Patent Application EP 1 433 606 A1, corresponding to U.S. Patent Application Publication No. US 2006/0101043 A1, which relates to a device for operating a printing press. The printing press has a control station with an operating desk for that purpose, which makes it possible for the operator to detect and to change colors of the current pages of a print job. The relevant colors for the printed page involved are supplied to the operator by the plant or appropriate control system, in order to reduce the risk of a mistake. The selection of the respective page number can be made manually through the operating desk or through the use of image detection with a camera and corresponding software evaluation. That therefore prevents the operating personnel form inadvertently carrying out color changes on a different page of a printed product from the product page actually selected. The appropriate changes of color are possible only for the product page selected.

In particular, when image recognition is used, however, there is the risk that the page displayed is not recognized correctly by the camera and then erroneous operations are possibly carried out.

SUMMARY OF THE INVENTION

It is accordingly an object of the invention to provide a method and an apparatus for operating printing presses, which overcome the hereinafore-mentioned disadvantages of the heretofore-known methods and devices of this general type and which further reduce the possibility of erroneous operations.

With the foregoing and other objects in view there is provided, in accordance with the invention, a method for controlling operating processes or measuring processes associated with a printed image applied to a printing material. The method comprises positioning the printing material on a desk, capturing or acquiring, with a camera device, image information from the printed image on the printing material, comparing, in a computer, data captured or acquired by the camera device with digital image data of the printed image, and triggering operating processes or measuring processes with the computer on a basis of an identified printed image on the printing material. Objects or persons covering the printing material are detected with the camera device and specific operating processes or measuring processes are carried out on a basis of the detected objects or persons covering the printing material.

The method according to the invention for controlling operating processes or measuring processes is suitable, in particular, for use in sheetfed offset printing presses, since proof sheets regularly have to be pulled and these have to be measured appropriately in order to determine deviations of the finished printed products from the original. To this end, the proof sheets are placed on a desk, so that the sheets can be registered by a camera device. This camera device is able to acquire image information from the printed image on the printing material lying on the desk, and the data acquired by the camera is compared in a computer with digital image data from the printed image. Operating processes or measuring processes can then be triggered in the computer on the basis of the identified printed image on the printing material. The computer can be a separate operating computer which communicates with the machine control system of the printing press, but the computer can also be integrated into the machine control system of the printing press. If the triggering of operating processes or measuring processes is carried out on the basis of the printed image acquired by the camera, then this acquisition must proceed as far as possible without error. In this case, however, there is the risk that the operating personnel will bend over the printing material and cover certain regions of the printed image. In this case, reliable recognition of the printed sheet being displayed is impossible, which is likewise the case when objects cover the printing material. In particular, during the performance of measuring processes, it is important that the printing material not be covered by objects or persons, since otherwise the measuring instrument is not able to carry out any correct measurement. In the case of operating processes, the computer can also be set up in such a way that the objects and persons covering the printing material are computed out of the acquired image, and in this way the partly covered image can nevertheless still be identified and can be compared with corresponding printing originals.

In accordance with another mode of the invention, provision is made for automatic recognition of the front or reverse side of a printing material to be carried out through the use of the camera and the digital image data of the printed image, and for operating processes or measuring processes to be triggered as a function of the side of the printing material lying on top. Through the use of the image recognition by the camera, it is possible for the computer to recognize the display of the front or reverse side of a printing material on the desk and to enable only those processes which correspond to the corresponding front or reverse side being displayed. To this end, in the computer in each case the front and reverse side of a printing material are known as digital printing originals, so that the image data acquired by the camera device can be compared with the digital data of the front or reverse side of the printing material. Identification of the front or reverse side by the computer is thus possible.

In accordance with a further mode of the invention, provision is made for the digital image data to be prepress stage data from the printed image. In this case, the digital image data is transmitted from the prepress stage to the computer through the use of data storage media or a network link. This avoids the entry of the digital image data into the computer by hand. Automatic transmission of the prepress stage data is carried out, in particular, in the case of the network link to the prepress stage, and thus it is possible for this data to be used for the recognition and assignment of operating processes or measuring processes in a printing material being displayed.

In accordance with an added mode of the invention, provision is made for operating elements to be provided on the control station of a machine processing printing material, and for the function of the operating elements to depend on the identification of the printed image of a printing material displayed on a desk area. For instance, specific operating elements on the control station can be blocked or rendered inactive if they are not needed due to the printed image of the sheet presently displayed. Thus, the risk for the operating personnel of using operating elements which do not match the printed sheet presently being displayed is reduced. It is thus possible to use only those operating elements which also actually serve a function for the sheet presently being displayed. For instance, in particular, operating push buttons for the adjustment of the inking zones can be adjusted in their functions on the basis of the printing material being displayed, so that only the inking zone operating push buttons which are assigned to appropriate inking zones on the printing material being displayed also have functions. This can also apply similarly to further operating push buttons, in particular to what are known as "soft keys" in the case of touch screens, which can in each case be populated differently. The population of the push buttons appearing on the touch screen or else of push buttons which are actually physically present, can then likewise be carried out on the basis of the printed image being displayed. Thus, the operating elements change, in each case in a manner matched to the printing material presently being displayed and thus, ultimately, also in a manner matched to the print job presently to be processed.

In accordance with an additional mode of the invention, this can, moreover, be implemented to the effect that when the printing material lying on the desk area is turned, the display of operating elements is matched to the respective side of the printing material lying on top. Thus, even within a print job, during recto and verso printing (perfecting), the operation can be matched appropriately to the front or reverse side of a printing material currently being displayed if the operator turns the sheet by hand.

In accordance with yet another mode of the invention, provision is advantageously made for the printing material to be displayed on a desk and for the relative orientation of the printing material in relation to its desk area to be registered by the camera device. This is important in particular when the desk is simultaneously used as a measuring desk. In this case, a measuring device is able to move over the sheet being displayed and measure color, register, etc. In order to be able to carry out these measurements correctly, it is important for the measuring instrument to know the coordinates of the sheet being displayed and in particular of the printed image. The orientation of the printing material and of the printed image applied thereto can be registered by the camera, according to the present invention, and thus any possible deviations relative to the measuring device present on the desk can be processed electronically and corrected. In the event of severe deviations, a warning can also be output to the operating personnel, so that the operating personnel can be given an opportunity to correct the orientation of the printing material on the desk appropriately. Erroneous measurements can therefore be avoided.

In accordance with yet a further mode of the invention, provision is advantageously made for the triggering of specific operating processes or measuring processes to also include the at least temporary blocking of specific operating processes or measuring processes. In particular, if there are objects on the sheet being displayed or the operating personnel bend over the desk, there is the risk that operating elements will inadvertently be pressed and thus operating processes will be unintentionally triggered. In addition, as a result of objects lying on the desk, a measuring instrument measuring the sheet can be damaged. These situations can be detected by the camera device and appropriate image processing, so that operating processes or measuring processes that would lead to an erroneous operation or damage to the measuring instrument are then blocked, at least until the objects and the persons have been moved away again.

In accordance with yet an added mode of the invention, provision is made for any measurements carried out on the printing material through the use of a measuring instrument to be stored in the computer and, in the event that double measurements are carried out, for a warning signal to be output or for the double measurement not to be carried out. Each measuring process and the associated measured sheet can be stored in the computer on the basis of the image recognition and the camera acquisition. Double measurements can be determined through the use of the comparison of measuring processes and measured sheets in the computer. Should the computer determine such a double measurement, then a warning signal is output to the operating personnel, so that the operating personnel become aware that a double measurement has already been carried out. The method according to the invention can, however, also be used for the purpose of not allowing double measurements to arise at all. In this case, if a sheet has already been measured once and it has been detected by the camera that the same sheet is displayed on the measuring desk again or that the personnel have inadvertently left the sheet lying thereon and not removed it, the measuring instrument is blocked and instead a warning signal is output, so that a double measurement is not carried out. In this way, double measurements can reliably be prevented.

In accordance with yet an additional mode of the invention, provision is made for gestures of an operator to be registered with the camera device and, through the use of the gestures, for measuring points on the printing material to be selected for registration by a measuring instrument that is present. The gestures of an operator can, for example, be extended fingers, with which the operator points to specific points of the printing material being displayed. These points identified in this way are then used as measuring points, for example for the color measuring instrument. This is expedient in the case of color measuring instruments which do not measure the entire sheet to be measured but are merely moved to individual measuring points. In this case, the measuring points which are to be approached do not then have to be entered into the measuring instrument in a cumbersome manner through a keyboard or a touch screen. Instead, it is sufficient for the operating personnel to point to the appropriate points of the printing material being displayed. The measuring points will then be registered by the camera, processed by the computer and passed on to the measuring instrument for the performance of the measuring processes.

In accordance with again another mode of the invention, the desk area has operating elements for setting inking zones in inking units of a printing press, a registration is made through the use of the camera device as to whether the operating elements are touched by fingers of an operator or by other objects and, depending on the contact detected, the operating elements are either enabled or blocked. In particular, in the case of operating elements for adjusting the inking zones, which elements are normally located in the close physical vicinity of the desk area for the printing material, there is the risk that inking zones will be adjusted inadvertently by a body part of the operating personnel being supported on the inking zone operating elements or objects lying around on the latter. Through the use of the camera device, it is now possible to detect whether the operating elements are actually being touched only by the fingers of the operating personnel or whether objects are located on them or other body parts of the operating personnel are operating the inking zones inadvertently. This increases the operating reliability further and avoids rejects resulting from inadvertently adjusted inking zones.

With the objects of the invention in view, there is also provided an apparatus for carrying out the method, in which the camera device is removable and suitable for use as a video magnifier.

Since a camera device is present in any case for the method according to the invention, it can thus also be used for other purposes. The camera device, which is expediently located above the desk, can be removed from an anchoring device by the operating personnel and then used as a video magnifier. Since the camera device must have a relatively high resolution in any case for its capabilities, it is excellently well suited for use as a video magnifier. During use as a video magnifier, the operating personnel hold the camera at a relatively short distance above the printing material and therefore in each case register only details of the printing material. Therefore, multiple enlargement of details of the printing material is possible, which can then be displayed on a monitor connected to the camera device. Through the use of the camera device, the operating personnel can thus scan the printing material in detail and have details of the printed image displayed highly magnified on the monitor and, in this way, detect even marginal printing defects without difficulty.

In accordance with a concomitant feature of the invention, the desk area or the area around the operating elements for inking zone control have light sources. In this case, in order to assist the camera device, small light sources, in particular in the form of LEDs, are fitted to the desk and thus lead to a backlit push button array. This makes it easier for the camera to detect objects or body parts of persons on the operating elements, since these cover the lights, which can be detected unambiguously by the camera. If no lights are covered, it may be assumed that there are no objects or body parts on the printing material. In this way, the lights further reduce the risk of erroneous operations or inadvertent operations.

Other features which are considered as characteristic for the invention are set forth in the appended claims.

Although the invention is illustrated and described herein as embodied in a method and an apparatus for operating printing presses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
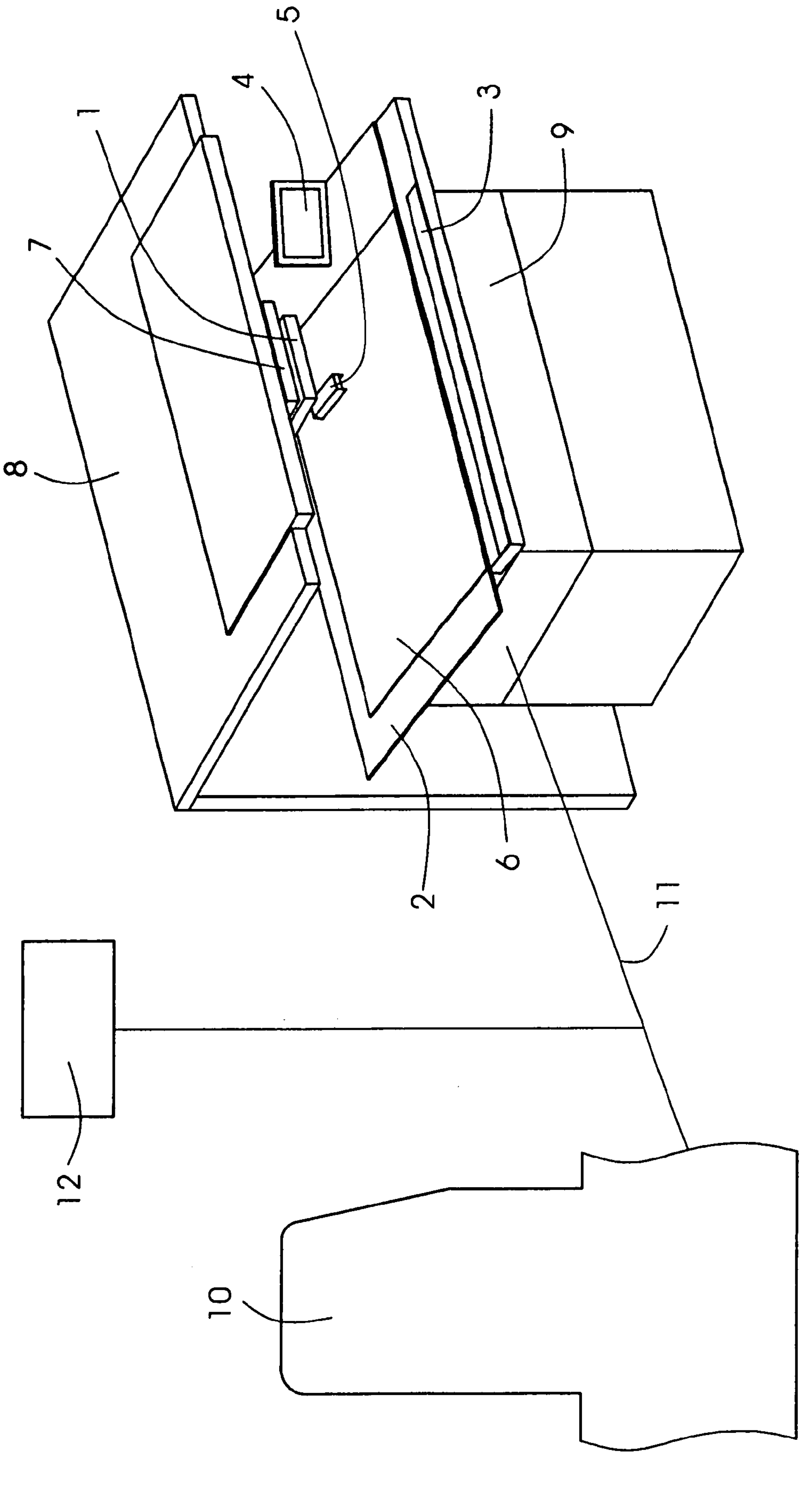
FIG. 1 is a diagrammatic, perspective view of a control station according to the invention for a printing press.

Referring now to the figures of the drawings in detail and first, particularly, to FIG. 1 thereof, there is seen an operating station 8 which has a desk 2 for the display of sheet printing materials or sheets 6. The desk 2 is angled slightly forward, so that operating personnel have a good view of the displayed sheets 6. In a region on the right hand side there is a monitor 4, which is constructed as a touch screen and permits the display and entry of operating data. The monitor 4 is connected to a computer 9, which is located in a lower region of the operating station 8, underneath the desk 2. The computer 9 in turn is able to communicate through a communications link 11 with a machine computer of a printing press 10 and with computers of a prepress stage 12. It is thus possible to arrange for data from the prepress stage 12 and for data from the printing press 10 to be displayed on the monitor 4. Furthermore, settings can be carried out through the monitor 4, both on the printing press 10 and, for example, in the case of plate exposers, on the prepress stage 12. The computer 9 is additionally connected to an image inspection measuring instrument 5, which permits diverse measuring processes to be carried out on the displayed sheets 6. The measuring instrument 5 is configured in such a way that it is able to scan the entire surface of a displayed sheet 6. In this case, color measurements and register measurements, etc. can be carried out. Furthermore, in a front region of the desk 2, there is an operating strip having inking zone operating push buttons 3. The inking zone operating push buttons 3 are disposed in such a way that they can be assigned to the inking zones of a sheet 6 lying on the desk 2. The operating station 8 has a roof, which carries a light 7 and a camera 1. The camera 1 is capable of registering not only the displayed sheet 6 but also regions around the sheet 6, in particular the inking zone operating push buttons 3. The camera 1 is in turn connected to the computer 9, so that the images acquired by the camera 1 can be processed in the computer 9 through image recognition. The lamp 7 is used for illuminating the displayed sheets 6 and in this way improves the image processing by the camera 1. Through the use of the camera 1 and the image recognition in the computer 9, it is possible to acquire printed images from sheets 6 and to compare them with further data in the computer 9. This data can, for example, be digital prepress stage data which is supplied by the prepress stage 12. However, it can also be digital data from print jobs, which are transmitted to the computer 9 through a print shop network or to the computer 9 through interchangeable data storage media. If, in this way, the image data of the print job currently to be finished is known to the computer 9, a comparison through the use of the camera 1 and the image processing in the computer 9 can be carried out as to whether or not the sheet 6 displayed on the desk 2 matches the print job currently being processed. If this is not the case, a warning can be output to the operating personnel, for example through the monitor 4, so that the operating personnel know immediately that a sheet 6 has inadvertently been displayed which does not originate from the print job actually running but clearly from another stack of printed products.

It is moreover possible, through the use of the image processing in the computer 9, to determine the position of a sheet 6 relative to the desk 2. For instance, a crooked display of the sheet 6 relative to the desk 2 can be detected, which is important in particular when carrying out measurements through the use of the image inspection measuring instrument 5. The measuring instrument 5 can normally perform correct measurements only when the sheet is also oriented appropriately. If the sheet 6 is detected as being incorrectly oriented through the use of the camera 1 and the image processing in the computer 9, a warning is likewise output on the monitor 4 and the measurement is not carried out until the sheet is displayed on the desk 2 within tolerances. In addition, through the use of the camera 1, objects and body parts of the operating personnel lying on the sheet 6 can be detected, so that measurements by the image inspection measuring instrument 5 are likewise prevented if the measuring instrument 5 would collide with the objects lying on the sheet 6 during the registration of the sheet 6.

Since there are inking zone operating push buttons 3 in the front region, they are particularly susceptible to inadvertent and erroneous operation by the personnel, because there is always the risk that, when bending forward for the purpose of obtaining a better view of the sheet 6, the operating personnel will support themselves on the inking zone operating push buttons 3 and thus inadvertently change the latter. Since settings in the inking units of the printing press 10 are trigged with the inking zone operating push buttons 3, there is the acute risk in this case that, as a result of these changed settings, prints with changed colors will be produced and that rejects will accumulate unnoticed. Such inadvertent operation can be prevented through the use of the present invention by locking the operating push buttons 3 when such supporting by the operating personnel is detected. This is also done through the use of the camera 1 and the image processing in the computer 9. As soon as it is not merely permissible body parts of the operating personnel, such as the fingers, which are detected on the operating push buttons 3, the inking zone operating push buttons 3 are all blocked or at least partly blocked in the region affected. Inadvertent operation and changing of the inking zone setting in the printing press 10 can therefore be prevented and thus, at the same time, the accumulation of unnecessary rejects as well. In addition, through the use of the camera 1, the turning of sheets 6 by the operating personnel can be detected, so that the inking zone operating push buttons 3 and operating elements on the monitor 4 can in each case be matched to the side displayed on the top of the sheets 6 which are printed on both sides. Thus, when turning sheets 6, the operating personnel do not themselves have to select the associated side on the monitor 4, so that the risk of erroneous operations is also reduced substantially in this case.

It is additionally possible to avoid unnecessary measuring processes through the use of the method according to the invention. For example, it is entirely possible for the operating personnel to display an already measured sheet 6 inadvertently for the second time or to inadvertently leave a sheet 6 lying on the desk after the measurement. By using the image content and production markings, such as those from the counting mechanism of the printing press 10, the camera 1, in cooperation with the image processing of the computer 9, can identify each sheet 6 and assign the associated measuring processes. If the camera 1 establishes that the sheet 6 currently displayed has already been measured, then a further measuring process by the image inspection instrument 5 is firstly avoided and a warning to the operating personnel is output on the monitor 4. If the operating personnel deliberately ignore this warning through the use of an appropriate entry push button on the monitor 4, it is of course also possible for a second measurement to be carried out deliberately.

The measuring instrument 5 can also be configured in such a way that it does not move to all of the sheet 6 for measurements but only to specific measuring points on the sheet 6, selected by the operating personnel. In this case, the appropriate measuring points have to be entered into the measuring instrument 5. According to the present invention, this can be done through the use of simple gestures, i.e. for example through the use of finger pointing of the operating personnel to the appropriate points of the sheet 6 being displayed. The operating personnel then merely still have to point to the desired measuring points of the sheet 6, so that these points are detected automatically through the use of the camera 1 and the image processing in the computer 9. The computer 9 then transmits to the measuring instrument 5 the measuring points selected through the use of the gestures of the operating personnel. The same is also true of other settings, such as the selection of colors for the inking zone operating panel push buttons 3. If the operating personnel point to appropriate colors of the sheet 6, the inking zone operating push buttons 3 are populated in accordance with the color selected by the gestures of the operating personnel. The gestures of the operating personnel can also be used for the purpose of positioning a cursor on the monitor 4. In this case, too, the camera 1 registers movements of the fingers of the operating personnel, for example, and converts them into corresponding movements of the cursor on the monitor 4.

The camera 1 fitted in the upper region of the operating station 8 can additionally be configured as a removable video magnifier. In this case, the camera 1 can be removed from an anchoring device and thus used for the closer examination of the sheet 6. For this purpose, the camera 1 is either connected to the operating station 8 through an appropriately long cable connection, or wireless transmission of the image signals from the camera 1 to the computer 9 is carried out. The camera 1 then has a rechargeable battery for power supply. As soon as the camera 1 is deposited in this anchoring device again, the rechargeable battery can be charged up automatically by the mains or network. The operator can then move the video magnifier, that can be removed in this way, over the surface of the sheet 6 and have detailed enlargements of the sheet 6 displayed on the monitor 4. Quality control is therefore possible through the use of the camera 1 equipped as a video magnifier.

Figure 2:
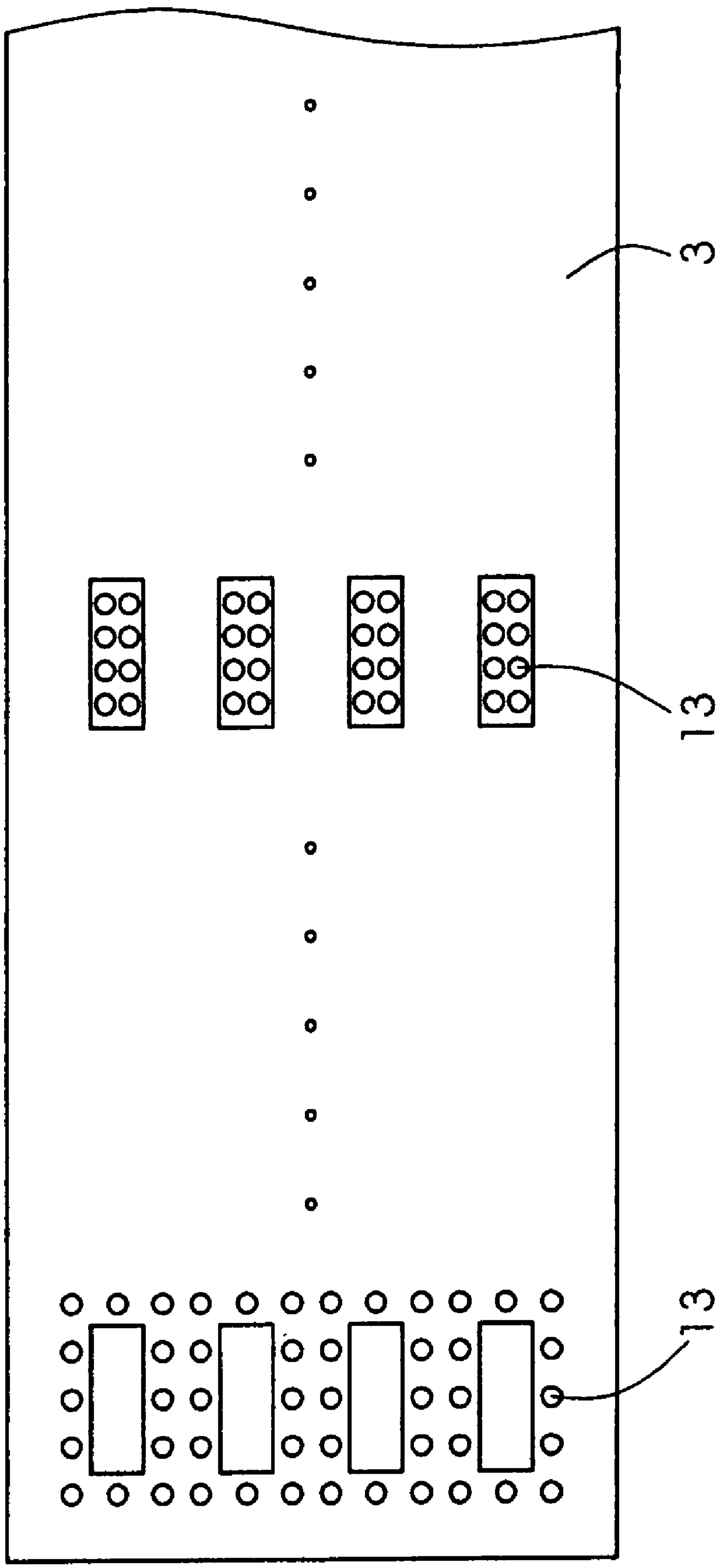
FIG. 2 is a fragmentary plan view of a backlit operating panel in the control station of a printing press.

FIG. 2 shows a portion of the operating panel for the inking zone operating push buttons 3. It can be seen that a plurality of inking zone operating push buttons 3 are always disposed one above another for one inking zone, so that the selection of the inking zone openings can be controlled by the operating personnel by touching the inking zone operating push buttons 3. In order to improve the detection of touching of the inking zone operating push buttons 3 by the operating personnel through the use of the camera 1, the inking zone operating push buttons 3 can be backlit. This can be done, firstly, as can be seen at the left-hand edge, through the use of light-emitting diodes 13 disposed around the operating push buttons 3 or, as can be seen in the central region, through the use of additional particularly brightly illuminating light-emitting diodes 13 within the inking zone operating push buttons 3. As a result of this luminous contrast, the image recognition through the use of the camera 1 and the computer 9 is improved considerably, so that in particular small objects can also be distinguished reliably from touching by fingers of the operating personnel.

We claim:

1. A method for controlling measuring processes associated with a printed image applied to a printing material, the method comprising the following steps:

positioning the printing material on a desk;

capturing, with a camera device, image information from the printed image on the printing material;

comparing, in a computer, data captured by the camera device with digital image data of the printed image;

triggering measuring processes of an image inspection device connected to the computer, with the computer, on a basis of an identified printed image on the printing material;

detecting, with the camera device, objects or persons covering the printing material;

carrying out, with the image inspection device, color measuring processes on the printed image on the printing material, on a basis of the detected objects or persons covering the printing material;

carrying out automatic recognition of a front or reverse side of a printing material with the camera device and the digital image data of the printed image; and triggering measuring processes of the image inspection device automatically with the computer as a function of the side of the printing material lying on top.

2. The method according to claim 1, wherein the digital image data is prepress stage data of the printed image.

3. The method according to claim 1, which further comprises:

providing operating elements on a control station of a machine processing printing material; and selecting a function of the operating elements in dependence on an identification of the printed image of a printing material lying on a desk area.

4. The method according to claim 3, which further comprises matching a display of the operating elements to a respective side of the printing material lying on top, when the printing material lying on the desk area is turned.

5. The method according to claim 1, which further comprises registering, with the camera device, a relative orientation of the printing material displayed on the desk, in relation to the desk area.

6. The method according to claim 1, wherein the step of triggering specific measuring processes also includes at least temporarily blocking specific measuring processes.

7. The method according to claim 1, which further comprises:

storing, in the computer, any measurements carried out on the printing material by a measuring instrument; and outputting a warning signal or failing to carry out a double measurement in the event that double measurements are carried out.

8. The method according to claim 1, which further comprises:

registering gestures of an operator with the camera device; and selecting, with the gestures, measuring points on the printing material for registration by a measuring instrument.

9. The method according to claim 1, which further comprises carrying out communication between the computer and at least one of a printing press or a prepress stage device.

10. The method according to claim 1, which further comprises:

providing the desk area with operating elements for setting inking zones in inking units of a printing press;

registering, with the camera device, whether the operating elements are touched by fingers of an operator or by other objects; and enabling or blocking the operating elements depending on a contact detected.

11. The method according to claim 1, which further comprises providing the desk with operating push buttons, and illuminating the operating push buttons with a light source having LEDs surrounding the operating push buttons.

12. The method according to claim 1, which further comprises removing the camera device from an anchoring device for closer examination of the printing material.

13. An apparatus for controlling measuring processes associated with a printed image applied to a printing material, the apparatus comprising:

a desk for positioning the printing material;

a camera device for capturing image information from the printed image on the printing material, said camera device being removable and configured for use as a video magnifier;

an image inspection device;

a computer connected to said camera device for comparing data captured by said camera device with digital image data of the printed image and connected to said image inspection device for triggering measuring processes of said image inspection device on a basis of an identified printed image on the printing material;

said camera device configured for detecting objects or persons covering the printing material for carrying out, with said image inspection device, color measuring processes on the printed image on the printing material, on a basis of the detected objects or persons covering the printing material;

said camera device configured for automatic recognition of a front or reverse side of a printing material with the digital image data of the printed image; and said computer triggering measuring processes of said image inspection device automatically as a function of the side of the printing material lying on top.

14. The apparatus according to claim 13, which further comprises operating push buttons associated with said desk, and a light source having LEDs surrounding and illuminating said operating push buttons.

15. The apparatus according to claim 13, which further comprises an anchoring device from which said camera device is removable.

* * * * *